(12) United States Patent
Dümpert et al.

(10) Patent No.: US 8,159,099 B2
(45) Date of Patent: Apr. 17, 2012

(54) STATOR HAVING BUSBARS FOR CONNECTION OF THE COILS, AND A CORRESPONDING METHOD

(75) Inventors: Ehrfried Dümpert, Hendungen (DE); Rainer Eckert, Bad Neustadt/Herschfeld (DE)

(73) Assignee: Siemens Aktiengesellschaft, Munich (DE)

( * ) Notice: Subject to any disclaimer, the term of this patent is extended or adjusted under 35 U.S.C. 154(b) by 322 days.

(21) Appl. No.: 12/598,992

(22) PCT Filed: Apr. 30, 2008

(86) PCT No.: PCT/EP2008/055364
§ 371 (c)(1),
(2), (4) Date: Nov. 5, 2009

(87) PCT Pub. No.: WO2008/135507
PCT Pub. Date: Nov. 13, 2008

(65) Prior Publication Data
US 2010/0141064 A1 Jun. 10, 2010

(30) Foreign Application Priority Data
May 7, 2007 (DE) .......................... 10 2007 021 321

(51) Int. Cl.
*H02K 11/00* (2006.01)
(52) U.S. Cl. .......................................................... 310/71
(58) Field of Classification Search .................... 310/71; 29/596–598
See application file for complete search history.

(56) References Cited

U.S. PATENT DOCUMENTS

| 4,633,110 | A | 12/1986 | Genco |
| 6,552,463 | B2 * | 4/2003 | Oohashi et al. ............... 310/207 |
| 7,202,582 | B2 | 4/2007 | Eckert et al. |
| 7,262,529 | B2 * | 8/2007 | Klappenbach et al. ......... 310/71 |
| 7,626,294 | B2 * | 12/2009 | Ohta et al. ...................... 310/71 |
| 7,692,356 | B2 | 4/2010 | Bott et al. |
| 7,712,367 | B2 | 5/2010 | Eckert et al. |
| 7,948,130 | B2 * | 5/2011 | Kitagawa ........................ 310/71 |
| 2006/0091745 | A1 * | 5/2006 | Klappenbach et al. ......... 310/71 |
| 2010/0060090 | A1 * | 3/2010 | Sakata ............................ 310/71 |

FOREIGN PATENT DOCUMENTS

| DE | 19924325 A1 | 12/1999 |
| DE | 103 28 720 A1 | 1/2005 |
| EP | 1 389 822 A2 | 2/2004 |
| GB | 2 092 029 A | 8/1982 |

OTHER PUBLICATIONS

C.Bala; Al.Fetita; V.Lefter; Handbuch der Wickeltechnik elektrischer Maschinen; $2^{nd}$ Edition Berlin, Verlag Technik, 1976, pp. 292-301; Verlag Technik, Berlin; Book; 1976.

* cited by examiner

*Primary Examiner* — Tran Nguyen
(74) *Attorney, Agent, or Firm* — Henry M. Feiereisen; Ursula B. Day

(57) ABSTRACT

The aim of the invention is to increase the degree of automation in the production of an electrical machine. Particularly, the aim is to be able automate the connection of the coils of an electrical machine. For this purpose, provision is made for the coil ends (17) to be connected using at least one busbar (20, 22). The ends (23) of the respective busbars (20, 22) are hot crimped or welded to the associated end (17) of the coil. Thus, it is possible to eliminate manual drilling and welding of the coil ends. Moreover, the hot-crimped and welded connections have a high degree of electric strength and a high current carrying capability.

9 Claims, 2 Drawing Sheets

STATOR HAVING BUSBARS FOR CONNECTION OF THE COILS, AND A CORRESPONDING METHOD

CROSS REFERENCES TO RELATED APPLICATIONS

This application is the U.S. National Stage of International Application No. PCT/EP2008/055364, filed Apr. 30, 2008, which designated the United States and has been published as International Publication No. WO 2008/135507 and which claims the priority of German Patent Application, Serial No. 10 2007 021 321.4, filed May 7, 2007, pursuant to 35 U.S.C. 119(a)-(d).

BACKGROUND OF THE INVENTION

The present invention relates to a stator of an electrical machine having a plurality of coils which are connected to one another on one side of the stator. The present invention also relates to a corresponding method for connection of a stator.

In the case of motors using pole coil technology, the winding ends must be connected to one another. This connection can be automated only with difficulty because of the highly flexible lacquered copper wires which are normally used for the motor coils.

Until now, the connection process has been carried out by manually twisting and welding or soldering the winding ends. A so-called circuit mount, into which the wires are inserted, is frequently used as insulation between the phases in the area of the winding ends. This makes it possible to dispense with special flexible insulating tubes.

Known alternatives to this are, for example, connection by means of a printed circuit board. However, connection such as this has the disadvantage of the reduced withstand voltage, the reduced current carrying capability and the reduced resistance to temperature. Furthermore, it is known for the connection to be made on a coated plastic mount using insulation-displacement terminal technology. However, insulation-displacement terminal technology has the disadvantage that only a restricted current can flow through the connections, because of the relatively high contact resistance.

The book Bălă, C., Fetita, Al., Lefter V.: Handbuch der Wickeltechnik elektrischer Maschinen. [Winding Technology Manual for Electrical Machines] $2^{nd}$ Edition Berlin, Verlag Technik, 1976, pages 292-301, discloses switching connections for connection of coil groups or of multiple coils. In the case of winding wires, these connections are produced by twisting and welding. In large machines, the connections composed of bars are bent and insulated, and solder sleeves are expedient for the connection in this case. Welding is suitable for the connection of wire ends. In particular, two wires which are cut off at right angles can be connected to one another by cold-pressure welding. In this case, the wires are pressed against one another with a butt joint by means of an apparatus, in such a way that the material is pinched all round the pressing point.

Furthermore, the document DE 103 28 720 A1 describes a connection element for a winding of an electrical machine, which has an annular mount composed of an insulating material, and conductor tracks arranged in the mount, for electrical connection of the coils and winding sections. For low-cost fabrication of a compact, physically small connection element, the conductor tracks are formed by sheet-metal parts which are inserted into the annular mount upright or staggered radially one behind the other, and offset with respect to one another in the circumferential direction. All the coil starts and coil ends are connected to contact lugs on the sheet-metal parts in a welding or soldering process.

SUMMARY OF THE INVENTION

The object of the present invention is therefore to connect coils of an electrical machine in a simple manner.

According to the invention, this object is achieved by a stator of an electrical machine having a plurality of coils which are connected to one another on one side of the stator, and at least one busbar, to which two of the plurality of coils are connected, in that the ends of the busbar are each hot-crimped to one end of one of the coils.

Furthermore, according to the invention, a method is provided for connection of the stator of an electrical machine by insertion of a plurality of coils into the laminated core of the stator, connection of the plurality of coils to one another on one side of the stator, two of the plurality of coils being connected by means of at least one busbar, in that the ends of the busbar are each hot-crimped to one end of one of the coils.

The connection technique for motors with pole coils can be automated further by the hot-crimping or welding of busbars to the coil ends according to the invention. This relates in particular to the accurate positioning of the contacts with the coil wire. Automated fabrication itself leads to a greatly reduced fabrication time. Further advantages of this connection technique are the high current carrying capability and the high withstand voltage. Furthermore, contact can be made flexibly with different circuits and shaft heights with a small number of busbar and current-link variants.

In addition, the connection of the coils according to the invention has the advantage that it avoids the normal laying and twisting of the wires for circuit mounts. In addition, the material costs are decreased because of the shorter winding ends in comparison to the conventional connection technique, since no long winding ends are required for twisting in this case. A further advantage is also that quality control is possible by visual inspection.

At least one holding section for fixing a busbar can be provided on the surface of each of the coils in the stator according to the invention. This makes it possible to improve the mechanical stiffness of the connection.

The busbar is preferably stamped from a metal sheet, and is rolled up at its ends for crimping. A busbar such as this can be produced and processed further easily.

The busbar may also have insulation in its central area. This insulation is advantageously in the form of a flexible fabric tube, a shrink sleeve or a sprayed sheath. This means that there is no need for a separate circuit mount, as a result of which the stator can be made shorter. In addition, the lack of the circuit mount reduces the material costs.

However, in specific cases, a contoured circuit mount can be fitted to the end face of the stator and the at least one busbar or busbars is laid in its contours. This means that there is no need for individual insulation of the busbars, and results in a mechanically robust connection.

According to a further preferred embodiment, the electrical supply lines are hot-crimped or welded to the stator in the same manner as the at least one busbar. The advantages of hot-crimping and welding are therefore also used for the electrical supply lines, specifically the high current carrying capability and the high withstand voltage.

Furthermore, an annular cover can be fitted to the end face of the stator, covering a plurality of busbars by means of which the coils are connected. This makes it possible to avoid or enlarge undesirable air gaps or creepage distances.

BRIEF DESCRIPTION OF THE DRAWING

The present invention will now be explained in more detail with reference to the attached drawings, in which.

DETAILED DESCRIPTION OF THE PREFERRED EMBODIMENTS

The exemplary embodiments described in more detail in the following text represent preferred embodiments of the present invention.

Figure 1:
FIG. 1 shows a plan view of a first embodiment of a busbar according to the invention.

Busbars 1 as shown in the example in FIG. 1 can be used to connect the winding ends of a motor using pole coil technology. A busbar such as this essentially comprises an elongated, bendable section 2 and rolled-up ends 3. In order to make contact between the busbar 1 and a winding end, a rolled-up end 3 is pushed onto the respective winding end, and is hot-crimped or welded there. During the process, the insulation at the winding end melts, thus creating a low-impedance electrical connection.

Figure 3:
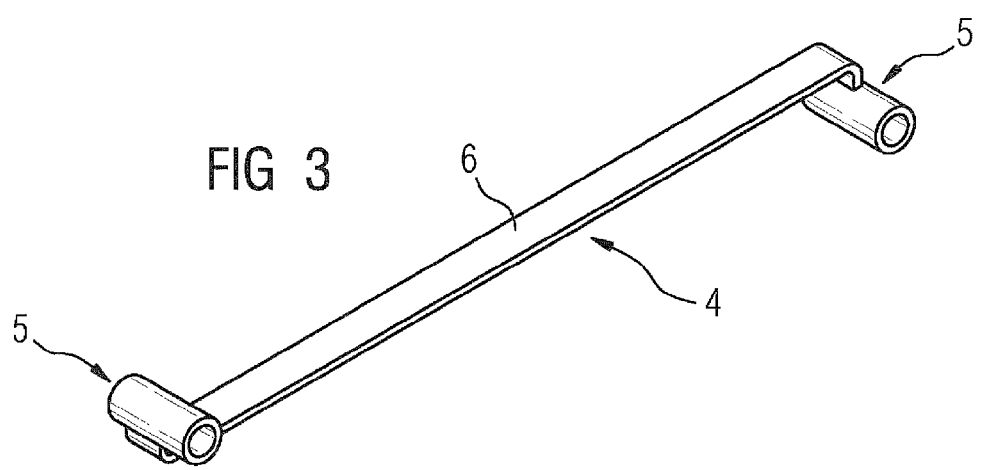
FIG. 3 shows a perspective illustration of the busbar shown in FIG. 2.

If the busbar is hot-crimped, then, depending on the crimping tool, it may be advantageous to bend the ends 5 of a busbar 4 through 90 degrees with respect to the longitudinal section 6. In the present case, this leads to the busbar having an exaggerated S-shape. A perspective view of this busbar 4 is illustrated in FIG. 3.

Figure 4:
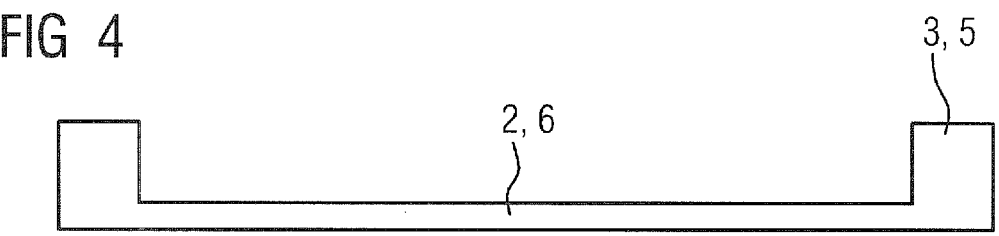
FIG. 4 shows a stamped sheet-metal piece for producing a busbar as shown in FIG. 1 or FIG. 2.

FIG. 4 shows a stamped blank from which a busbar 1 or 4 can be bent. This is a relatively simple sheet-metal element with an elongated center part 2, 6 and two rectangular end pieces 3, 5.

The busbar is ideally composed of copper, of suitable thickness. Its cross section must not only be adequate to carry the current, but must also ensure the required robustness.

The final shape in particular of the longitudinal section 2, 6 of the busbar can be matched to the necessary shaft heights or circuits by bending by hand. On the other hand, however, the busbars can also easily be preshaped such that they can be plugged directly onto the corresponding winding ends of the pole coils, in such a way that this plugging-on process can be carried out in an automated manner, as can the subsequent hot-crimping or arc welding, or another connection process which can be automated, as well.

Each busbar 1, 4 can be insulated at the points which are passed over or into the vicinity of coils of other phases. This ensures the respectively required withstand voltage. In this case, the insulation should be designed such that the individual busbars do not infringe the minimum air gaps and creepage distances to be complied with. For example, the insulation can be provided cost-effectively by pushed-on flexible fabric tubes or shrink sleeves. Higher-quality insulation will be achievable by extrusion coating. If the insulation is in different colors, it is possible to visually distinguish between the phases.

Figure 5:
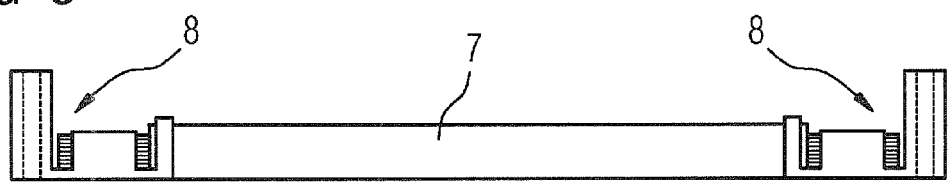
FIG. 5 shows a braided line with a hot-crimp connector.

In this case, the expression "busbars" also means braided lines with hot-crimp connectors, which are used for connection of the coils. A braided line 7 such as this is illustrated in the form of a side view in FIG. 5. Hot-crimp connectors 8 are crimped to each of the ends of the braided line 7. The length and the cross section of the braided line 7 can be matched to the respective circuit or electrical embodiment. A solid copper wire can also be used instead of the braid. The braided line 7 including the hot-crimp connectors 8 is connected to the winding ends of the coils in the same way as the busbar 1, 4.

Figure 6:
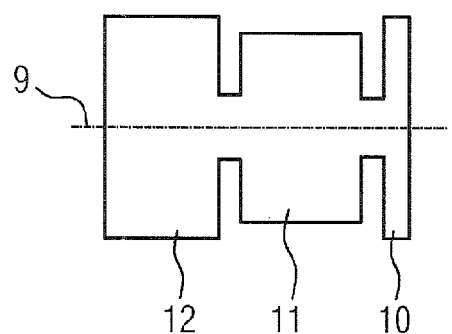
FIG. 6 shows a stamped blank of a hot-crimp connector as shown in FIG. 5.
Figure 7:
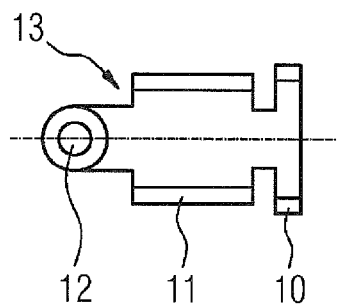
FIG. 7 shows the hot-crimp connector in a bent form.

The stamped blank of the hot-crimp connector 8 is illustrated in FIG. 6 and is symmetrical with respect to a longitudinal axis 9, with three lugs 10, 11, 12 on each side. The first lug 10 is narrow and is used to clasp the braided line 7 including its insulation. The central lug 11 is used to make electrical contact with a stripped braid end. The hot-crimp connector is crimped to the braid end by means of this lug 11. A third lug 12 is, finally, used to form a tubular or C-shaped end, which represents the hot-crimped area for making contact with a winding end (cf. FIG. 7 with the alternative: C-shape). The internal diameter of this tubular structure 13 can be chosen such that the winding end of a coil can be inserted without any problems. FIG. 7 also shows that the lugs 10 and 11 are bent vertically upwards, before being crimped to the respective braided conductor.

The hot-crimp connector 8 can also be designed to accommodate a plurality of braids or wires. In general, the connection for these braids or wires is made by soldering for stripped copper wire and by means of welding or hot-crimping for insulated lacquered copper wire.

By way of example, the hot-crimp connector 8 may be composed of the alloy CuSn 0.15. The thickness of the metal sheet from which the stamped blank as shown in FIG. 6 is obtained is, preferably, 0.6 to 0.8 mm.

Figure 8:
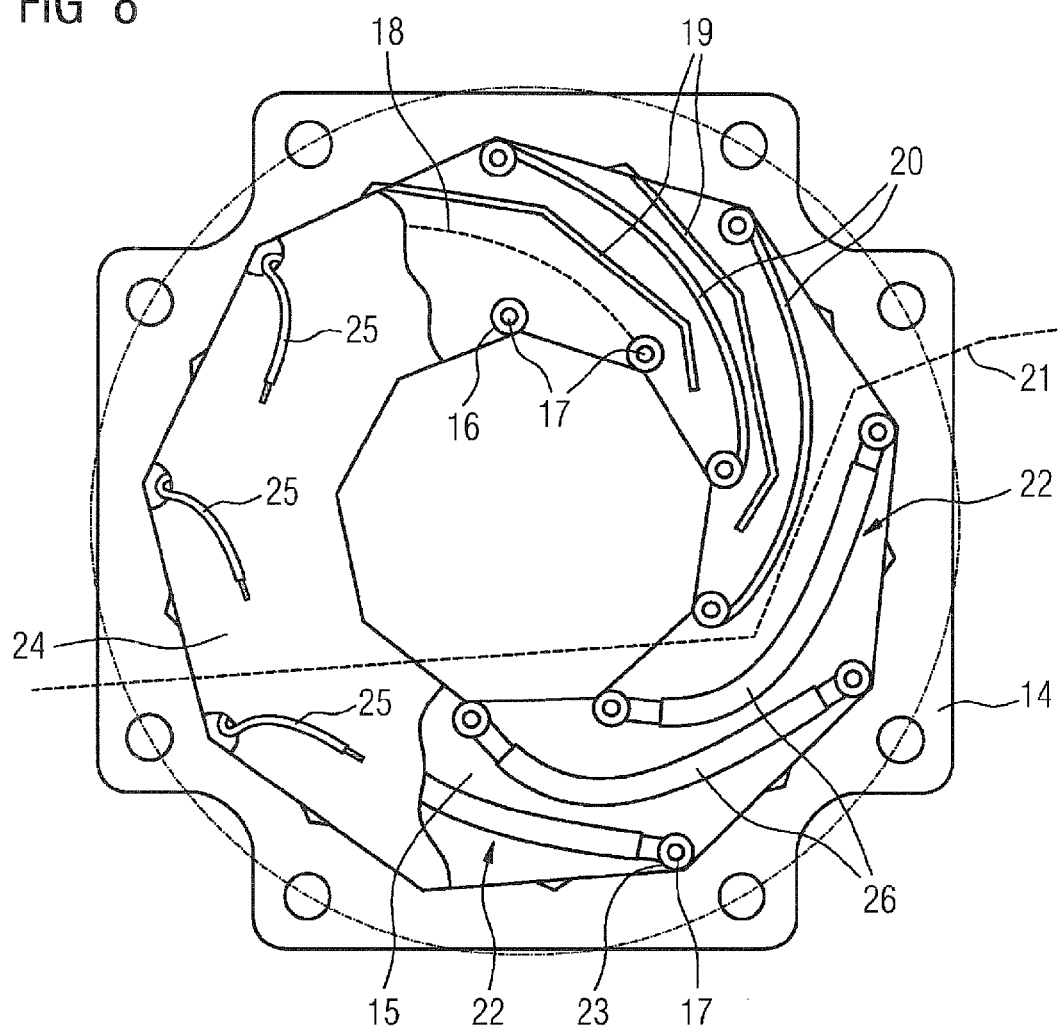
FIG. 8 shows an end-face view of a stator using the connection techniques according to the invention.

FIG. 8 now shows, schematically, the connection of the coils of a stator in various ways. A plurality of coils are located in a laminated stator coil 14, although in the example shown in FIG. 8 they are covered by a plastic disk 15, and therefore cannot be seen. In some circumstances, there is no need for the plastic disk 15, which may be in the form of a circuit mount (cf. the statements below). The plastic disk 15 has holes 16 in order to allow the coil wire 17, that is to say the winding ends, of the coils located underneath to be passed through. In addition, markings 18 are applied to the plastic disk 15, in order to simplify the laying of connecting links. Furthermore, insulating webs 19 are provided on the plastic disk 15 and isolate the individual connecting links 20, that is to say the busbars, from one another. In this case, it is sufficient for the connecting links 19 to be uninsulated.

Figure 2:
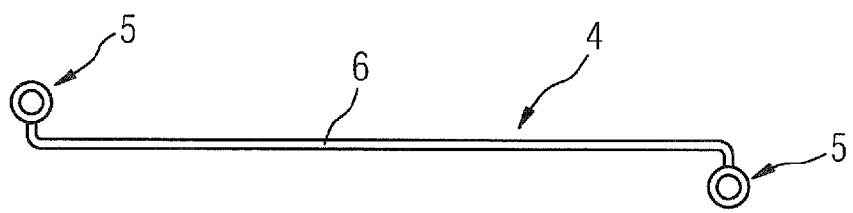
FIG. 2 shows a plan view of a second embodiment of a busbar according to the invention.

As can also be seen, the connecting links 20 in each case connect two winding ends or one winding end and a winding start to one another. The form of the connection chosen in FIG. 8 makes it necessary for the busbars and connecting links 20 to be curved. In principle, however, differently shaped busbars are also feasible, for example S-shaped busbars as shown in FIG. 2.

Corresponding to one alternative embodiment, that is illustrated under the dashed line 21 in the lower area of FIG. 8, the electrical links 22 are formed with insulation 26. This avoids the need for insulating webs 19 on the plastic panel 15. The electrical links 22 therefore have suitable insulation in their elongated section, for example a flexible fabric tube, shrink sleeve or sprayed jacket. However, the insulation also in principle means that there is no need for the plastic disk 15, since the insulation surrounding the connecting link 22 also electrically insulates this from coils located underneath. The rest of the function of the circuit mount or of the plastic panel 15, specifically to fix the busbars 21, can also be provided by the coil formers. These can then be appropriately shaped.

The contact is preferably made between the ends 23 of the busbars 20, 22 and the coil ends 17 by soldering, when the coil ends are stripped, or by welding or hot-crimping when the coil ends are insulated. The same connection technique can be used at the star point or on the stator supply lines. In principle, all the connections between the busbars or connecting lines on the one hand and the coil ends on the other hand can be carried out by automatic machines.

In the example chosen in FIG. 8, the connection on the end face of the stator is covered by a cover 24. Only the supply lines 25 for the three phases U, V and W are passed out through the cover 24. The annular cover 24 ensures the insulation of all the contact points with the motor housing and/or rotor and, if necessary, ensures the required air gaps and creepage distances.

What is claimed is:

1. A stator of an electrical machine, comprising:
   a plurality of coils connected to one another on one side of the stator; and
   at least one busbar connecting two of the plurality of coils and having ends, one end of the at least one busbar being hot-crimped to one end of one of the coils and another end of the at least one busbar being hot-crimped to one end of the other one of the coils.

2. The stator of claim 1, wherein each of the coils has on its surface at least one holding section for fixing the busbar.

3. The stator of claim 1, wherein the at least one busbar is stamped from a metal sheet, with the ends of the busbar having a rolled-up configuration.

4. The stator of claim 1, wherein the at least one busbar has a central area, further comprising an insulation disposed in the central area.

5. The stator of claim 4, wherein the insulation is a flexible fabric tube, a shrink sleeve or a sprayed sheath.

6. The stator of claim 1, further comprising a contoured circuit mount fitted to an end face of the stator, said at least one busbar being laid to follow a contour of the circuit mount.

7. The stator of claim 1, further comprising electrical supply lines crimped or welded to the stator in a same manner as the at least one busbar.

8. The stator of claim 1, further comprising an annular cover fitted to an end face of the stator and covering a plurality of busbars by which the coils are connected.

9. A method of interconnecting a stator of an electrical machine, comprising the steps of:
   inserting a plurality of coils into a laminated core of the stator;
   interconnecting the plurality of coils to one another on one side of the stator, wherein two of the plurality of coils are interconnected by at least one busbar; and
   hot-crimping one end of the at least one busbar to one end of one of the coils and hot-crimping another end of the at least one busbar to one end of the other one of the coils.

* * * * *